(12) United States Patent
Shimoda et al.

(10) Patent No.: US 7,788,782 B2
(45) Date of Patent: Sep. 7, 2010

(54) SUSPENSION ASSEMBLY POSITIONING METHOD

(75) Inventors: Toshihisa Shimoda, Tochigi (JP);
Keiichiro Maekawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 1036 days.

(21) Appl. No.: 11/515,753

(22) Filed: Sep. 6, 2006

(65) Prior Publication Data

US 2007/0055484 A1 Mar. 8, 2007

(30) Foreign Application Priority Data

Sep. 8, 2005 (JP) ............................. 2005-261146

(51) Int. Cl.
*B23Q 17/00* (2006.01)
*G06F 17/50* (2006.01)
(52) U.S. Cl. ........................................ 29/407.05; 703/1
(58) Field of Classification Search .............. 29/407.05, 29/407.09, 464, 468; 33/288, 203.18, 203.15, 33/203.17, 203; 356/155; 73/774; 703/1
See application file for complete search history.

(56) References Cited

U.S. PATENT DOCUMENTS

| 3,876,310 | A | * | 4/1975 | Berndt | 356/155 |
| 4,466,196 | A | * | 8/1984 | Woodruff | 33/288 |
| 5,600,893 | A | * | 2/1997 | Phillips | 33/203.18 |

FOREIGN PATENT DOCUMENTS

JP 7-10674 2/1995

* cited by examiner

*Primary Examiner*—John C Hong
(74) *Attorney, Agent, or Firm*—Kratz, Quintos & Hanson, LLP

(57) ABSTRACT

A first reference position C1 constituting a middle point is calculated by measuring positions of left and right damper attaching holes 22 in a white body 12. A second reference position C2 constituting a middle point is calculated by measuring positions of left and right hubs 44 in a suspension assembly 20. A position of the suspension assembly 20 is adjusted by a slide table 56 such that the first reference position C1 and the second reference position C2 are coincident with each other. The suspension assembly 20 is moved up by a lift mechanism 59 and is attached to the white body 12.

3 Claims, 9 Drawing Sheets

SUSPENSION ASSEMBLY POSITIONING METHOD

This application claims foreign priority from Japanese Patent Application No. 2005-261146, filed Sep. 8, 2005, the entire contents of which are hereby incorporated by reference.

BACKGROUND OF THE INVENTION

1. Field of the Invention

The present invention relates to a suspension assembly positioning method for positioning a suspension assembly relative to a vehicle body frame member when the suspension assembly is attached to the vehicle body frame member.

2. Related Art

A suspension of a vehicle is easily and preferably attached to a vehicle body frame member or the like, if a suspension assembly including with a steering mechanism, a link mechanism, a tire attaching portion, a brake mechanism and an engine or the like is previously integrated into one assembly.

When a suspension assembly is attached to a vehicle body frame member, a positioning needs to be carried out such that relative positions of the suspension assembly and the vehicle body frame member are pertinently matched. As such a positioning method, JP-B-07-010674 discloses a method of attaching a suspension assembly while detecting a position of a reference hole on a vehicle body formed as a reference index mark by a visual sensor. Specifically, a position of a mounting face of a rotary lift table is adjusted based on a signal provided from a pair of position detecting visual sensors detecting outer peripheral corners of the vehicle body. Successively, a positional shift is corrected by finely adjusting the position of the mounting face of the rotary lift table based on a signal provided from a position detecting visual sensor provided at a center of the rotary lift table in order to detect a reference hole of a vehicle.

Meanwhile, the vehicle body frame member or the suspension assembly is a composite member integrated with a plurality of working portions, a plurality of mechanisms and the like and dimensional errors of the respective portions are accumulated.

Therefore, there is a concern that a dimension of an attaching portion is not formed sufficiently highly accurately. That is, as shown by FIG. 10, there can be a case in which a center position 3 of left and right damper attaching holes 2 of a vehicle body frame member 1 may not be coincident with a position of a reference hole 4 provided at a center position of the vehicle body frame member 1. Further, there can be a case in which a center position 6 of the suspension assembly 5 may not be coincident with the center position 3 of the damper attaching holes 2.

Therefore, if an adjustment of matching the center position 6 to the reference hole 4 is carried out, a damper head portion 7 and the damper attaching hole 2 are not coincident with each other. When the suspension assembly 5 is assembled to the vehicle body frame member 1 as it is, the damper 7 and a hub 8 are inclined and deviations $\theta 1$, $\theta 2$ are brought about in left and right camber angles. Although the deviations $\theta 1$, $\theta 2$ and the camber angles are aligned at a later step, the alignment operation requires a considerable time period. In addition, the alignment operation needs a skill of an operator and complicated alignment machines.

The invention has been carried out in consideration of such a problem.

SUMMARY OF THE INVENTION

One or more embodiments of the present invention provide a suspension assembly positioning method for reducing a deviation and a variation in a camber angle.

In accordance with one or more embodiments of the present invention, a method of positioning a suspension assembly relative to a vehicle body frame member is provided with: a step of measuring left and right damper attaching positions in the vehicle body frame member; a step of calculating a middle point in a vehicle width direction of the measured left and right damper attaching positions as a first reference position; a step of measuring left and right tire attaching positions in the suspension assembly; a step of calculating a middle point in the vehicle width direction of the measured left and right tire attaching positions as a second reference position; and a step of adjusting the suspension assembly or the vehicle body frame member such that the first reference position and the second reference position are coincident with each other.

By making the first reference position and the second reference position coincident with each other in this way, a deviation or a variation in a camber angle after the suspension assembly is mounted to the vehicle body frame member is restrained.

Further, in accordance with one or more embodiments of the present invention, the method may be carried out at a plurality of stations of a transfer line for transferring the vehicle body frame member, the step of measuring the left and right damper attaching positions may be carried out at a former station, the left and right tire attaching positions is carried out at a later station. Thereby, after calculating the second reference position by measuring the left and right damper attaching positions, positioning adjustment can immediately be carried out so that tact time can be shortened.

Further, in accordance with one or more embodiments of the present invention, each one of the left and right damper attaching positions may be measured by scanning three or more portions of a periphery of the one of the left and right damper attaching positions by a distance sensor of a noncontact type. Thereby, a three-dimensional position of the position of attaching the damper is specified and further accurate measurement is carried out.

In the method of positioning the suspension assembly according to one or more embodiments of the invention, by individually measuring and calculating the first reference position constituting the center of the left and right damper attaching positions and the second reference position constituting the center of the left and right tire attaching positions and making the first reference position and the second reference position coincident with each other, an influence of dimensional errors of the vehicle body frame member and the suspension assembly is reduced, and a deviation or a variation in a camber angle after the suspension assembly is mounted to the vehicle body frame member is restrained.

Other aspects and advantages of the invention will be apparent from the following description and the appended claims.

DETAILED DESCRIPTION OF THE EXEMPLARY EMBODIMENTS

A suspension assembly positioning method according to the invention will be explained by describing an exemplary embodiment in reference to attached FIG. 1 through FIG. 9 as follows.

Figure 1:
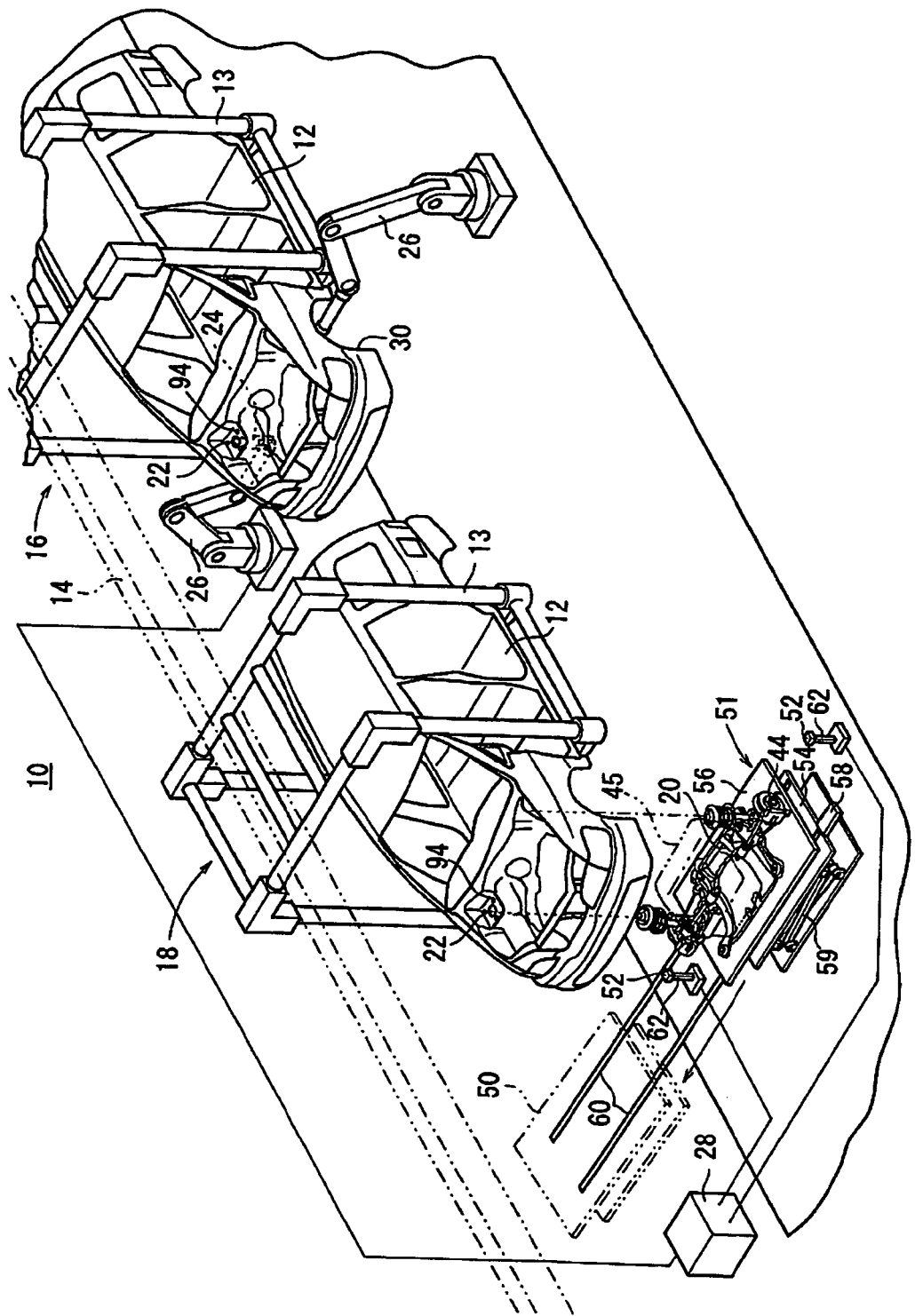
FIG. 1 is a perspective view of an assembly station.

A suspension assembly positioning method of the exemplary embodiment is carried out by an assembly station 10 shown in FIG. 1. The assembly station 10 is constituted by a transfer line 14 for suspending a white body (vehicle body frame member) 12 by a hanger 13 to be successively transferred, a first sub station 16 to which the white body 12 is transferred in first from a preceding step, and a second sub station 18 to which the white body 12 is successively transferred in. The white body 12 is a monocoque structure comprising a base frame constituting a vehicle, and damper attaching holes 22 for attaching a suspension assembly 20 are provided at left and right sides in an engine compartment. (The left and right damper attaching holes 22 correspond to the left and right damper attaching positions 22, in the present exemplary embodiment.) The white body 12 is transferred at a slightly higher portion by the transfer line 14.

Figure 2:
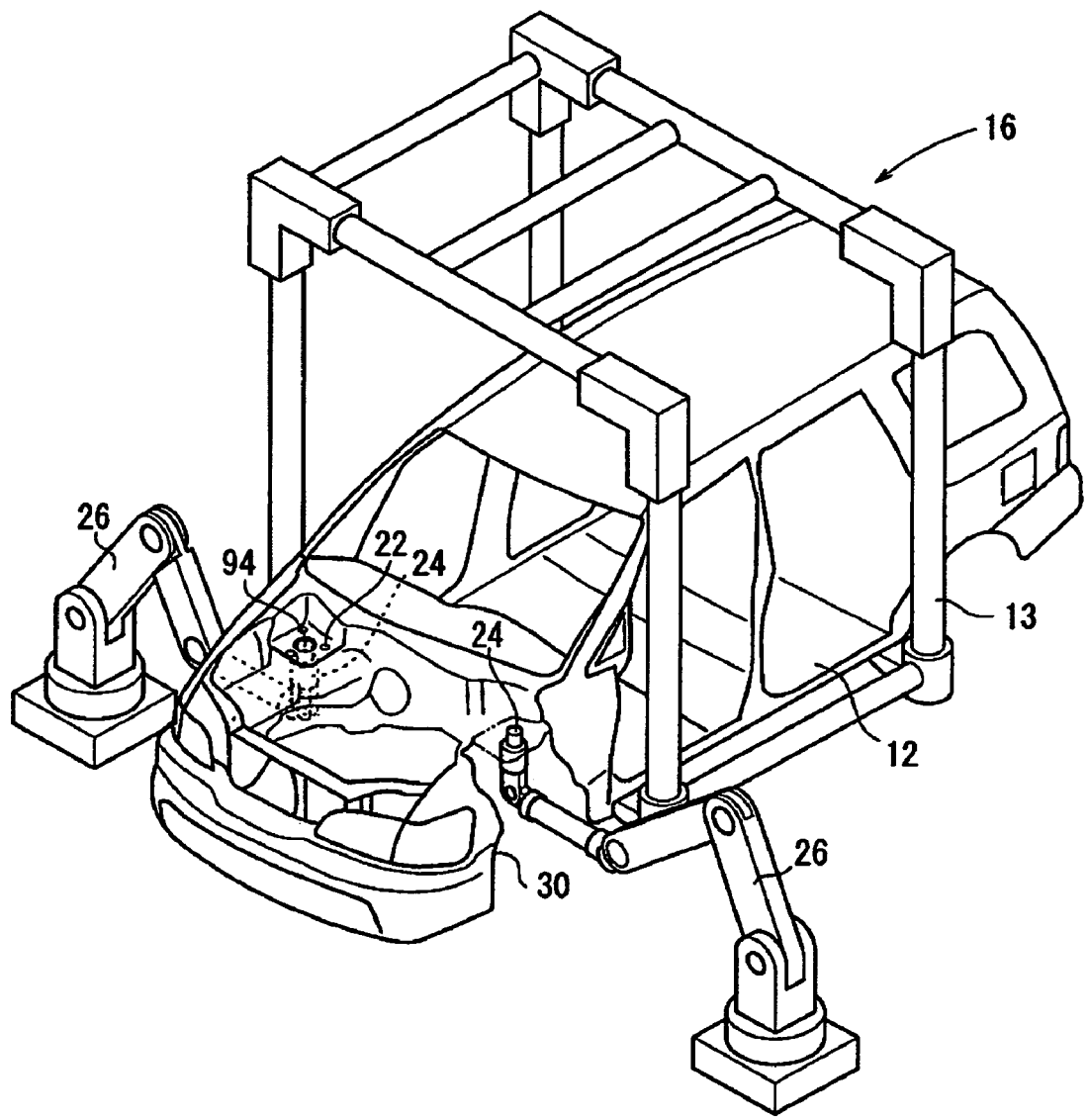
FIG. 2 is a partially sectional perspective view of a first sub station.

As shown by FIG. 2, vicinities of left and right sides of the white body 12 in the first sub station 16 are provided with robots 26 having noncontact type distance sensors for damper holes 24 at front ends thereof. Each robot 26 is of an articulated type for industrial use and can move the distance sensor for damper hole 24 in an arbitrary attitude at an arbitrary position in an operational range. The robot 26 is operated in synchronism with the transfer line 14 under operation of a controller 28 and measures a position of the damper attaching hole 22 of the white body 12 transferred in to the first sub station 16 by using the distance sensor for damper hole 24. That is, the robot 26 inserts a front end portion thereof from a wheel house 30 of a front wheel of the white body 12 and scans predetermined paths R1, R2 and R3 (refer to FIG. 7) while directing a measuring face of the distance sensor for damper hole 24 to an upper side, and measures the position of the damper attaching hole 22.

Figure 3:
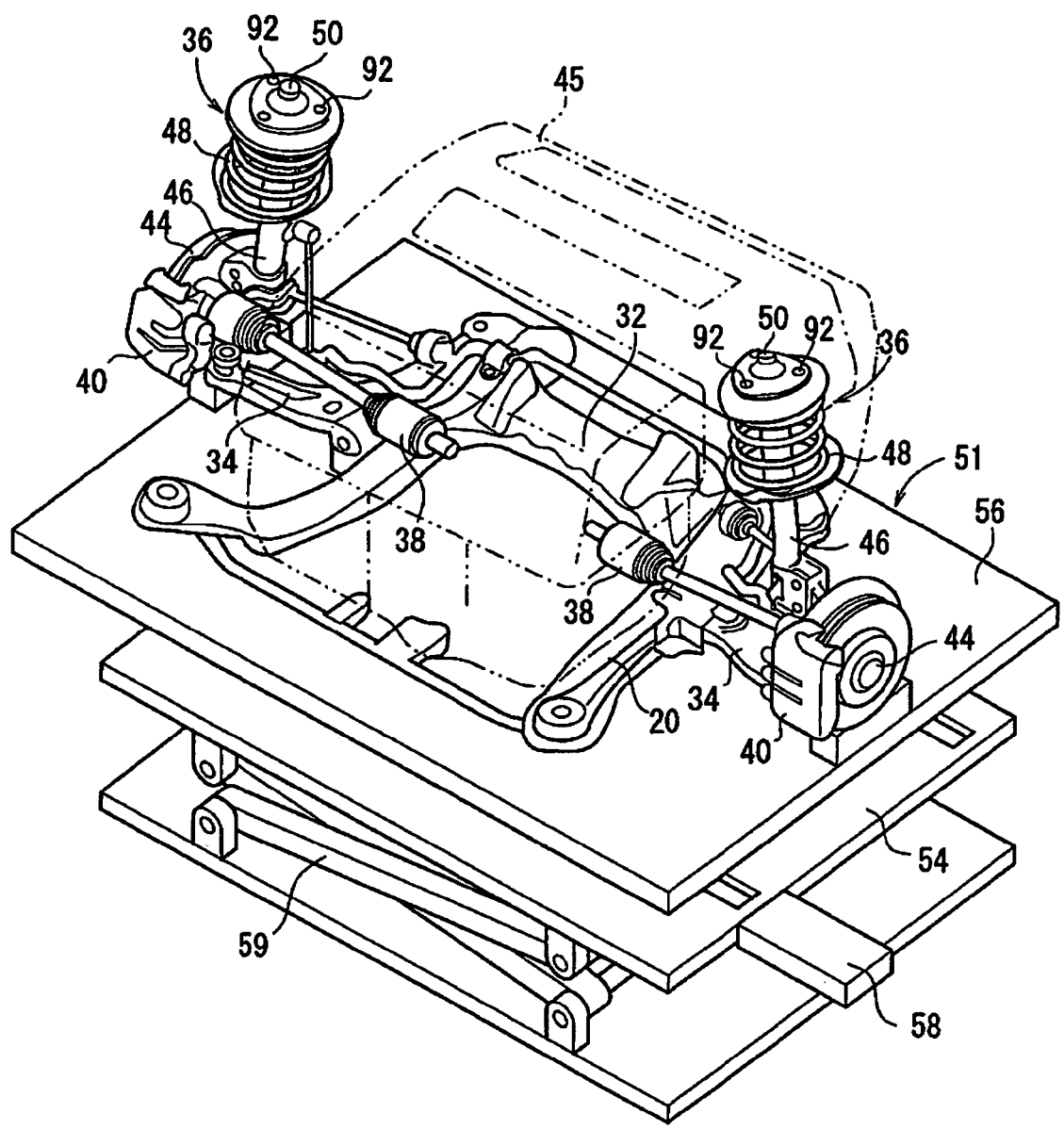
FIG. 3 is a perspective view of a suspension assembly and a mounting base.
Figure 8:
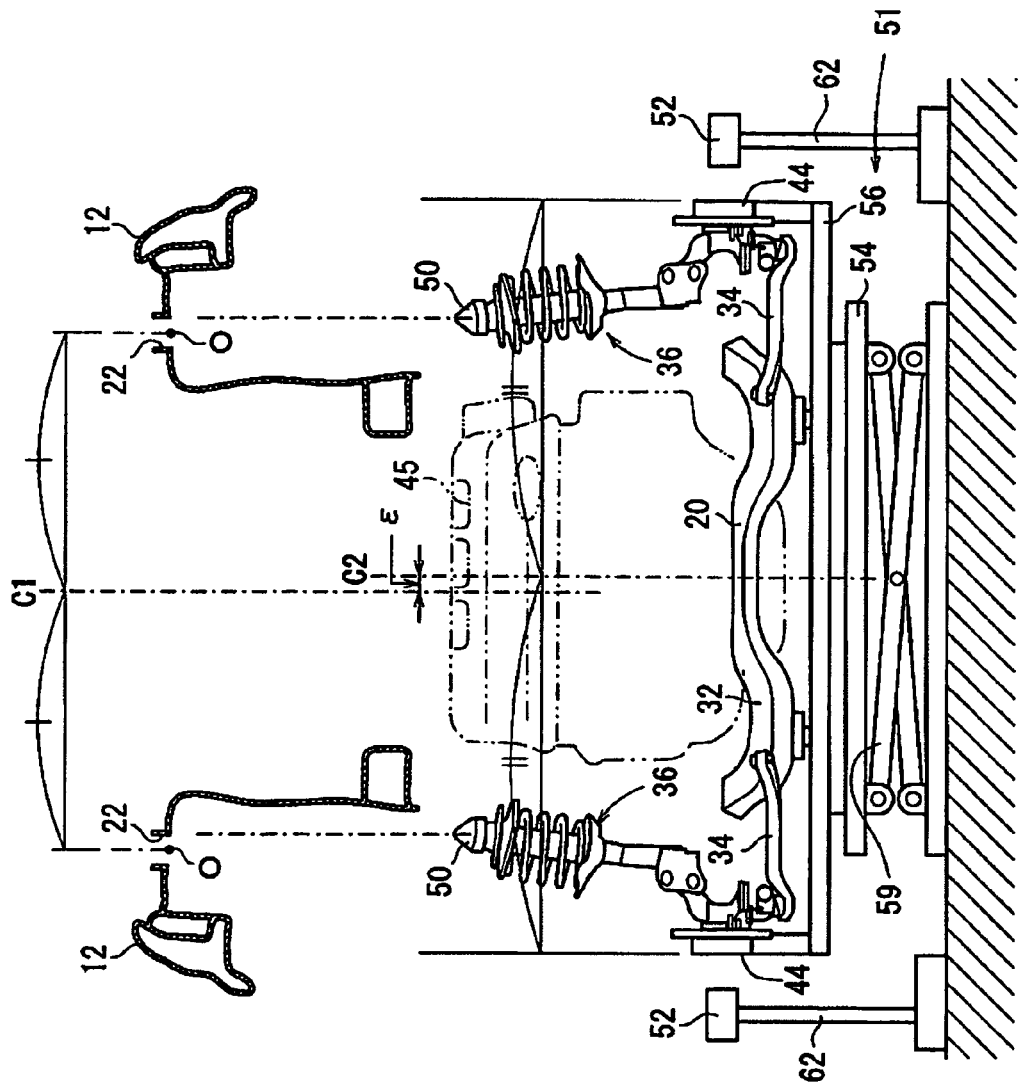
FIG. 8 is a schematic front view showing a positional relationship between the suspension assembly and a white body before positioning.

As shown by FIG. 3, the suspension assembly 20 is a mechanism on a front side of the vehicle, constituted on the basis of a sub frame 32, and left and right sides of the sub frame 32 are integrated with pairs of lower arms 34, damper assemblies 36, constant velocity joints 38, brake mechanisms 40, a steering rod 42, a pair of hubs 44 and an engine 45. The damper assembly 36 comprises a damper 46 and a spring 48, and an upper face thereof is provided with a damper head portion 50 to be inserted into the damper attaching hole 22. Further, the engine 45 is indicated by an imaginary line in FIG. 1, FIG. 3, FIG. 8 and FIG. 9 in order to be able to easily understand the constitution of the suspension assembly 20. The hub 44 is integrated to constitute a rectified camber angle and is attached with a tire at a later step. (That is, the left and right hubs 44 correspond to the left and right tire attaching positions 44, in the exemplary embodiment.) According to the exemplary embodiment, the rectified camber angle is illustrated as 0° (FIG. 3, FIG. 8 and the like). The suspension assembly 20 may be brought into a state without the engine.

As shown by FIG. 1 and FIG. 3, the second sub station 18 includes a mounting base 51 for mounting and moving up and down the suspension assembly 20, and a pair of distance sensors for hubs 52 for measuring positions of the left and right hubs 44 of the mounted suspension assembly 20. The mounting base 51 includes a base 54, a slide table 56 moved in a left and right direction (a vehicle width direction of the white body 12 transferred in) on the base 54, a linear sensor 58 for detecting a position of the slide table 56, and a lift mechanism 59. The slide table 56 and the lift mechanism 59 are automatically operated under operation of the controller 28.

The mounting base 51 is arranged on a lower side of the engine compartment of the white body 12 transferred in to the second sub station 18, and moves up the suspension assembly 20 by the lift mechanism 59 to be integrated to the white body 12. Further, the mounting base 51 can be moved in a transverse direction along a rail 60, integrates the suspension assembly 20 to the white body 12, moves down the lift mechanism 59, thereafter, is moved in the transverse direction, and a new one of the suspension assembly 20 is mounted on the slide table 56 by predetermined transfer in means.

The distance sensors for hubs 52 are respectively supported by stays 62, and arranged at a height capable of measuring positions of side faces of the hubs 44 of the suspension assembly 20 in a state of moving down the lift mechanism 59. The distance sensor for hub 52 is set to be able to measure the face of the hub 44 vertically in accordance with the rectified camber angle. Distance signals measured by the respective distance sensors for hubs 52 are supplied to the controller 28. When the mounting base 51 is moved along the rail 60, the distance sensor hub 52 on one side is automatically escaped to a predetermined position so as not to be interfered therewith.

Figure 4:
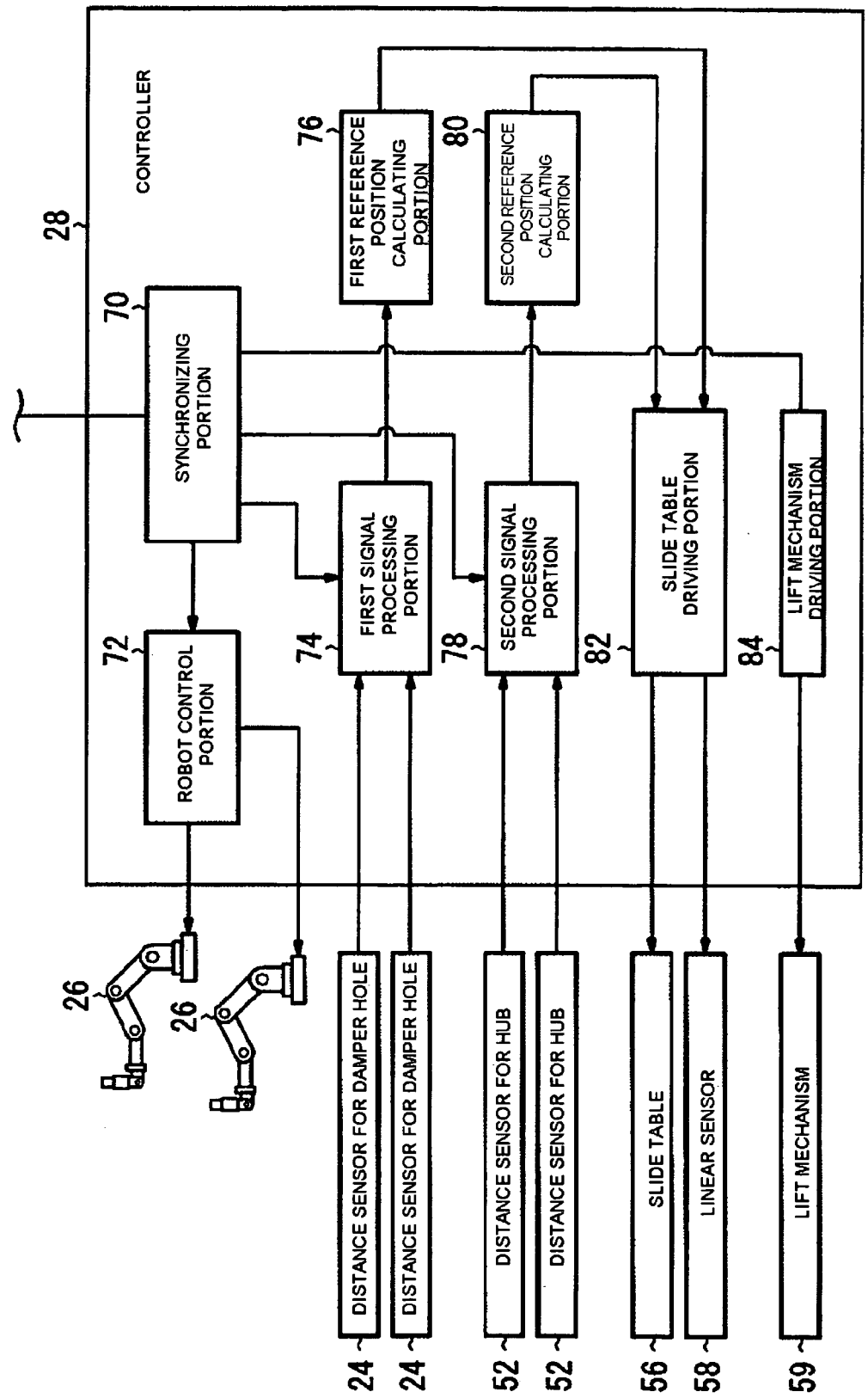
FIG. 4 is a block constitution diagram of a controller.

As shown by FIG. 4, the controller 28 includes a synchronizing portion 70 for communicating with a predetermined external controller, a robot control portion 72 for driving the robot 26, a first signal processing portion 74 for calculating a position of the damper attaching hole 22 by receiving the signal of the distance sensor for damper hole 24, and a first reference position calculating portion 76 for calculating a first reference position C1 in correspondence with a middle point of the two damper attaching holes 22 in the vehicle width direction. The controller 28 further includes a second signal processing portion 78 for calculating a position of the hub 44 by receiving the signal of the distance sensor for hub 52, a second reference position calculating portion 80 for calculating a second reference position C2 in correspondence with a middle point of the two hubs 44 in the vehicle width direction, a slide table driving portion 82 for operating the slide table 56 based on the first reference position C1 and the second reference position C2, and a lift mechanism driving portion 84 for operating the lift mechanism 59. The synchronizing portion 70 monitors a situation of operating the transfer line 14 based on a signal provided from the exterminable controller, detects that the white body 12 is transferred in to the first sub station 16 and the second sub station 18 and issues an instruction of start of processing to respective functional portions.

Next, an explanation will be given of a method of assembling the suspension assembly 20 to the white body 12 in the assembly station 10 constituted in this way.

Figure 6:
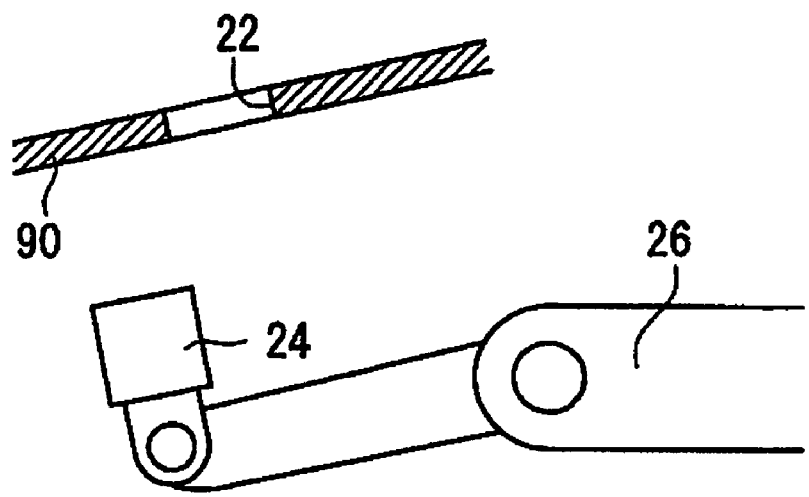
FIG. 6 is a schematic sectional side view showing a behavior of operating a distance sensor such that a distance from a sheet metal becomes substantially constant at a vicinity of a damper attaching hole.

First, at step S1, the synchronizing portion 70 detects that the white body 12 is transferred in to the first sub station 16, and operates the robots 26 for measuring the positions of the left and right damper attaching holes 22 based thereon. At this occasion, as shown by FIG. 6, the distance sensor for damper hole 24 attached to the front end of the robot 26 is operated such that a distance thereof to a sheet metal 90 becomes substantially constant at a vicinity of the damper attaching hole 22.

Figure 7:
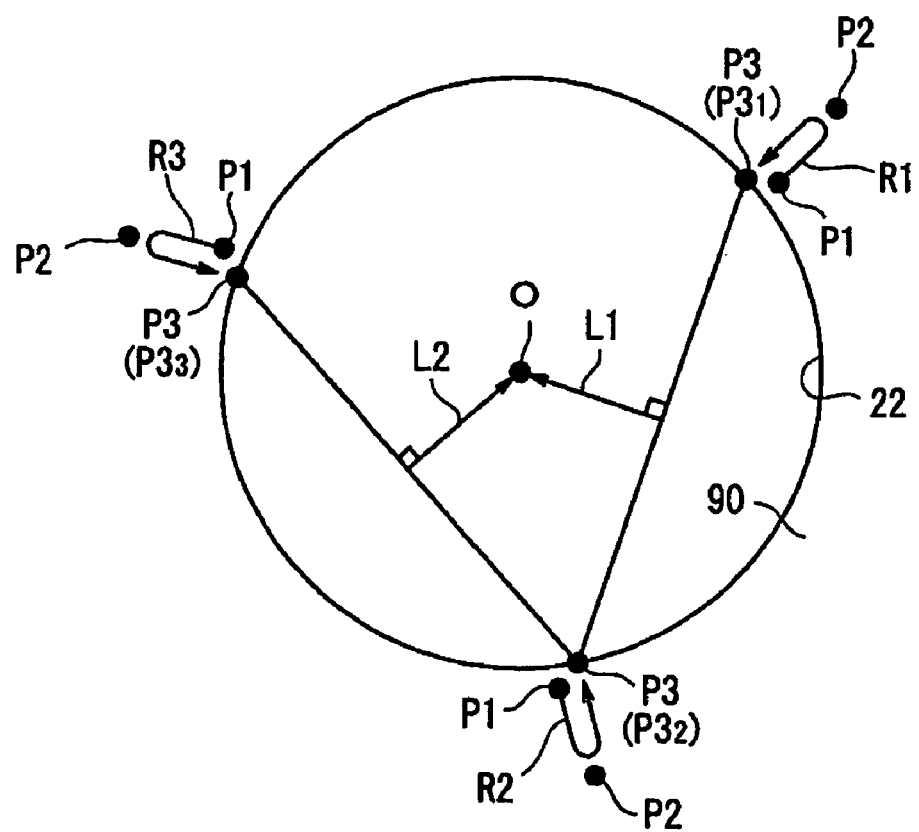
FIG. 7 is a schematic plane view showing a moving path for scanning the distance sensor at a vicinity of a damper attaching hole.

Further, in moving the sensor, as shown by FIG. 7, scanning is successively carried out along three paths R1, R2 and R3. At rectified portions constituted by substantially equally dividing a surrounding of the damper attaching hole 22 into three, the paths R1, R2 and R3 are moved from points P1 slightly on an outer side of an outer peripheral portion in outer directions, returned at predetermined outermost portions P2 and moved to an inner side and finished when the paths reach edges P3 of the damper attaching hole 22. When the sensor reaches the edge P3, there is not the sheet 90, a measured signal is significantly changed and therefore, it is recognized that the sensor reaches the edge P3. After measuring the positions in an order of the three paths R1, R2 and R3, the robot 26 is escaped to a predetermined position.

Further, measurement of the position of the damper attaching hole 22 is not limited by the distance sensor for damper hole 24 but two-dimensional measuring means of a CCD camera or the like may be used. In this case, a three-dimensional position may be recognized by a principle of triangulation by taking an image of the damper attaching hole 22 from two locations. Means for scanning the distance sensor for damper hole 24 is not limited to the robot 26 but an exclusive moving mechanism may be used. The moving paths to be scanned are not limited to three portions of R1, R2 and R3 but may be four or more portions.

At step S2, a center point O of the damper attaching hole 22 is calculated from the three edges P3 by the first signal processing portion 74. In the calculating processing, for example, the three edges P3 are differentiated as edges $P3_1$, $P3_2$, $P3_3$, on a face set by the edges $P3_1$, $P3_2$, $P3_3$, the center point O is calculated as an intersection of an orthogonal line L1 equally dividing a linear line connecting the edge $P3_1$ and the edge $P3_2$ into two and an orthogonal line L2 constituted by equally dividing a linear line connecting the edges $P3_2$ and the edge $P3_3$ into two. The center point O is calculated with regard to the left and right damper attaching holes 22 independently from each other.

In this way, according to the three edges $P3_1$ through $P3_3$ or more, the three-dimensional position of the damper attaching hole 22 is specified and the further accurate measurement is carried out.

Further, an inclination of the sheet metal 90 at a periphery of the damper attaching hole 22 is recognized from the measured distance signals at respective paths R1 through R3 to be subjected to a predetermined processing.

At step S3, there is the first reference position calculating portion 76, the first reference position C1 in correspondence with the middle point in the vehicle width direction of the center point O of the left and right damper attaching holes 22 is calculated. The first reference position C1 is calculated based on a spatial middle point of the two center points O.

At step S4, the transfer line 14 is driven under operation of a predetermined external control controller, and the white body 12 disposed at the first sub station 16 is transferred to the successive second sub station 18. Further, since a plurality of the white bodies 12 are continuously and intermittently transferred at the transfer line 14, also a new one of the white body 12 is transferred in from a preceding step to the first sub station 16 and the damper attaching hole 22 is continuously measured by the robot 26.

At step S5, after confirming that the suspension assembly 20 is mounted on the mounting base 51, the mounting base 51 is moved to a lower portion of the transfer line 14 along the rail 60. At this occasion, the lift mechanism 59 is moved down.

At step S6, the synchronizing portion 70 confirms that the suspension assembly 20 is mounted on the mounting base 51 and measures the positions of the left and right hubs 44 of the suspension assembly 20 by the distance sensors for hubs 52. Further, since the damper end portion 50 is inserted into the damper attaching hole 22, the suspension assembly 20 may measure the position of the damper end portion 50, however, the shape of the damper end portion 50 is complicated and it is difficult to measure the shape by the distance sensor for hub 52. In contrast thereto, the side face of the hub 44 is constituted by a plane face and therefore, the side face is suitable for being measured by the distance sensor for hub 52. Further, a distance between the hub 44 and the damper head portion 50 is small, positions thereof relative to each other are hardly accumulated with errors, and the position of the damper head portion 50 is accurately rectified by measuring the position of the hub 44.

At step S7, by the second signal processing portion 78, the second reference position C2 in correspondence with the middle point of the left and right hubs 44 in the vehicle width direction is calculated. Here, since the error is hardly accumulated between the hub 44 and the damper head portion 50, the second reference position C2 is substantially equivalent to the middle position of the left and right damper head portions 50.

At the time point, as shown by FIG. 8, the first reference position C1 and the second reference position C2 are not necessarily coincident with each other and an error E can be present. This is because the white body 12 or the suspension assembly 20 is constituted by a composite member integrated with a plurality of machining portions, a plurality of mechanisms and the like and dimensional errors of respective portion are accumulated.

At step S8, the position of the suspension assembly 20 is adjusted by driving the slide table 56 in the vehicle width direction such that the first reference position C1 and the second reference position C2 are coincident with each other. That is, positioning is carried out by moving the slide table 56 by the error ε between the first reference position C1 and the second reference position C2 in reference to the detecting signal of the linear sensor 58 or the distance sensor for hub 52 under operation of the slide table driving portion 82.

Figure 9:
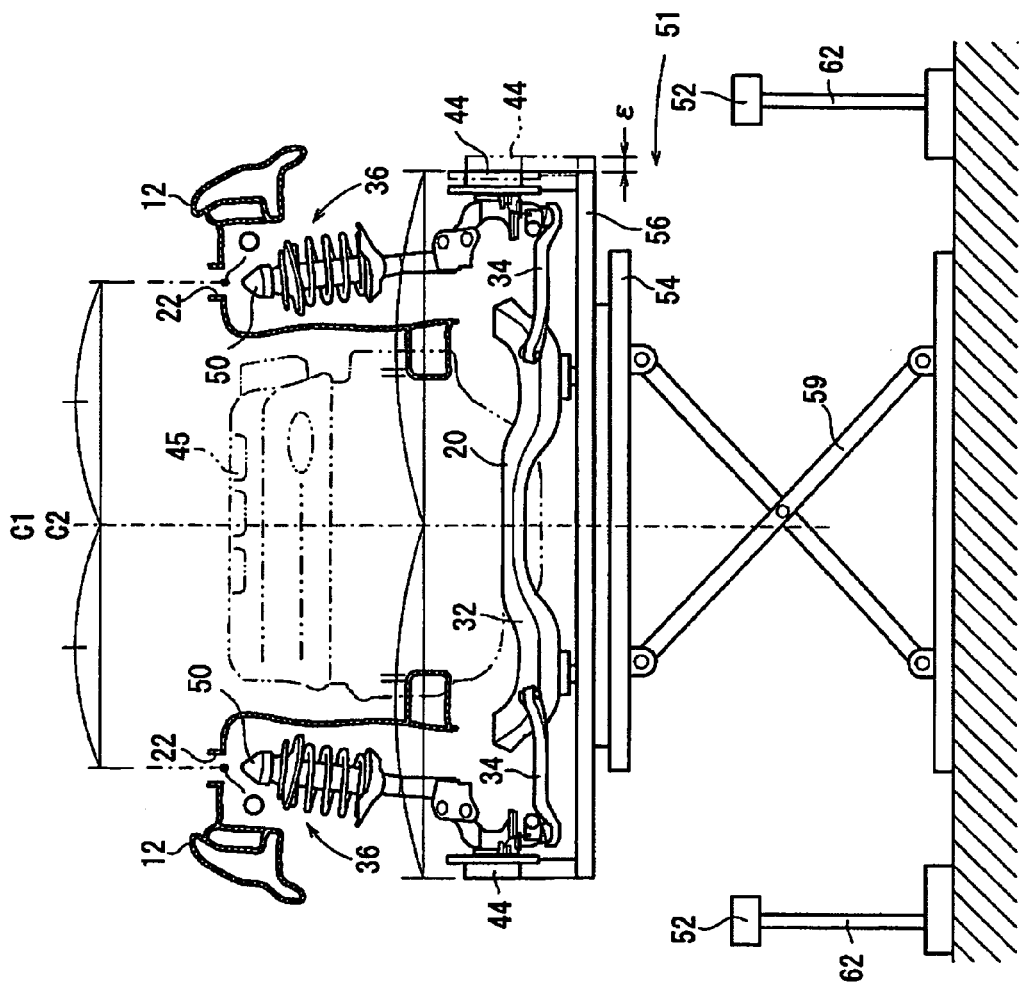
FIG. 9 is a schematic front view showing a positional relationship between the suspension assembly and the white body after positioning.
Figure 10:
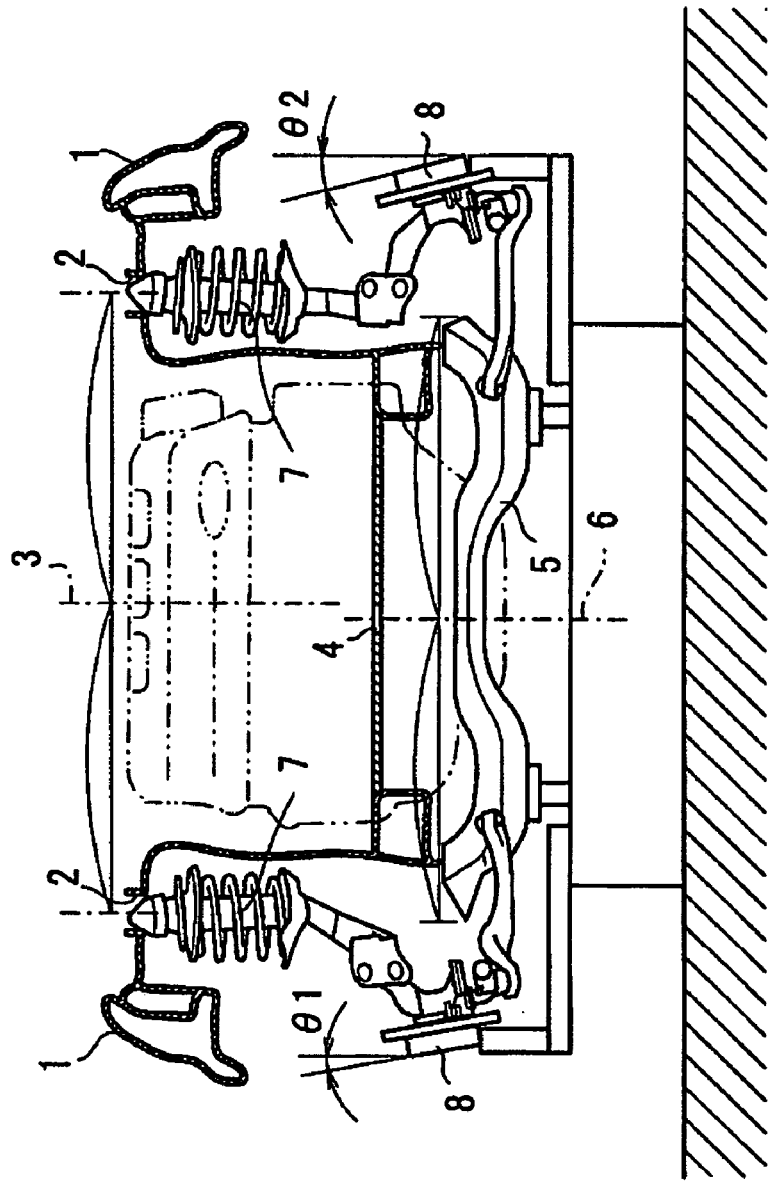
FIG. 10 is a schematic front view showing a state of attaching a suspension assembly by a positioning method according to a related art.

Thereby, as shown by FIG. 9, the left and right damper attaching holes 22 and the left and right damper head portions 50 are arranged at the positions symmetrical in a left and right direction by constituting differences by the first reference position C1 and the second reference position C2 to be substantially coincident with each other.

Further, in the positioning step of step S8, the positions of the white body 12 and the suspension assembly 20 relative to each other may be adjusted to make the first reference position C1 and the second reference position C2 coincident with each other and not only the suspension assembly 20 is moved but the white body 12 may be moved by a predetermined mechanism.

At step S9, the lift mechanism 59 is moved up and the left and right damper head portions 50 are inserted into the corresponding damper attaching holes 22. At this occasion, since the damper attaching holes 22 and the left and right damper head portions 50 are symmetrical in the left and right direction by constituting the references by the first reference position C1 and the second reference position C2 to be arranged at positions substantially coincident with each other, the damper assembly 36 and the hub 44 or the like are attached without hardly changing angles of inclination thereof and previously set and adjusted camber angles are maintained.

In accordance with inserting the damper head portion 50 into the damper attaching hole 22, three screws 92 (refer to FIG. 3) provided at a surrounding of the damper head portion 50 are inserted into three attaching holes 94 (refer to FIG. 1) provided at a surrounding of the damper attaching hole 22, nuts are screwed to the screws 92 to be fixed thereby. Further, the suspension assembly 20 is attached to the white body 12 by inserting a bolt provided at the sub frame 32 to a predetermined long hole of the white body 12 to be fixed by a nut. The white body 12 attached with the suspension assembly 20 at the second sub station 18 is transferred to a succeeding step by the transfer line 14.

As described above, according to the method of positioning the suspension assembly according to the exemplary embodiment, by individually measuring and calculating the first reference position C1 of the left and right damper attaching holes 22 and the second reference position C2 of the hubs 44 constituting the left and right tire attaching positions and positioning to adjust the first reference position C1 and the second reference position C2 to be coincident with each other, an influence of dimensional errors of the white body 12 and the suspension assembly 20 is reduced, and the deviation or the variation in the camber angle is restrained. Thereby, a later step of adjusting the deviation of the camber angle is dispensed with, or an adjusting time period at the step can considerably be shortened.

Further, it is not necessary to provide the white body 12 with a reference point for positioning the suspension assembly 20.

Figure 5:
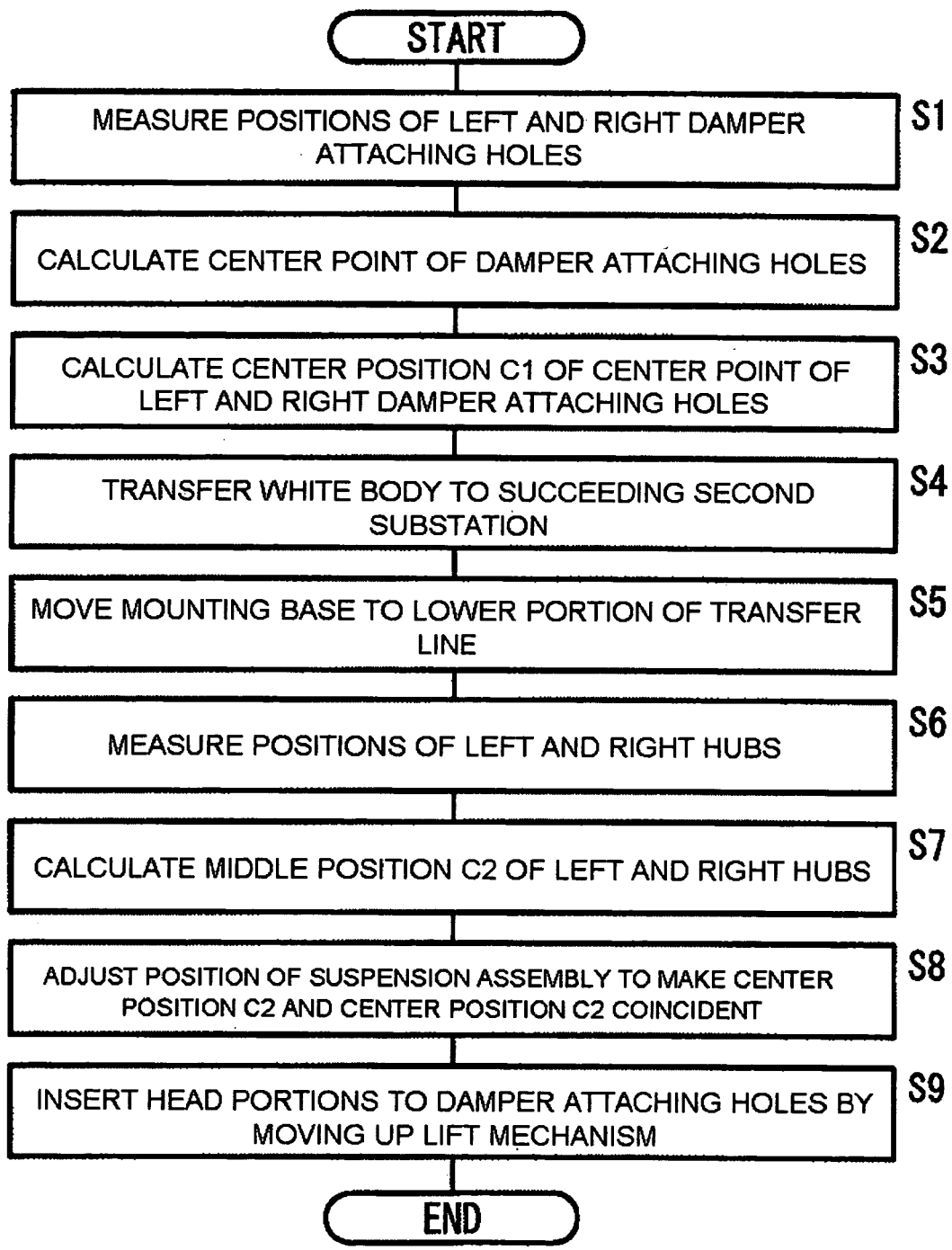
FIG. 5 is a flowchart showing a procedure of a method of positioning a suspension assembly according to an exemplary embodiment.

Although an explanation has been given such that the respective steps shown in FIG. 5 are continuously carried out successively for convenience of explanation, processings at the first sub station 16 and processings at the second sub station 18 can be carried out in parallel with each other. Although in measuring the position of the damper attaching hole 22, a time period is required more than that in measuring the position of the hub 44 since scanning is carried out on the three paths R1 through R3, by previously measuring the position of the damper attaching hole 22 at the first sub station 16, attachment of the suspension assembly 20 to the white body 12 transferred in to the second sub station 18 can be carried out swiftly and tact time can be shortened.

Further, although in the above-described explanation, an explanation has been given of an example of attaching the suspension assembly 20 on the front side to the white body 12, also a suspension assembly on a rear side can be attached thereto by a similar procedure. Attachment of the suspension assembly on the rear side may be carried out simultaneously and in parallel with attachment of the suspension assembly 20 on the front side in the first sub station 16 and the second sub station 18.

The method of positioning the suspension assembly according to the exemplary embodiment is not limited to that in fabricating the vehicle but is applicable also to a case in which the suspension assembly 20 is temporarily detached and thereafter attached to the vehicle body frame member (including the vehicle per se) again in maintenance of a finished vehicle. Further, the method is applicable to the suspension assembly 20 of various suspension types of a strut type, a double wishbone type and the like.

It will be apparent to those skilled in the art that various modifications and variations can be made to the described exemplary embodiments of the present invention without departing from the spirit or scope of the invention. Thus, it is intended that the present invention cover all modifications and variations of this invention consistent with the scope of the appended claims and their equivalents.

What is claimed is:

1. A method of positioning a suspension assembly relative to a vehicle body frame member, the method comprising:
measuring left and right damper attaching positions in the vehicle body frame member;
calculating a middle point in a vehicle width direction of the measured left and right damper attaching positions as a first reference position;
measuring left and right tire attaching positions in the suspension assembly;
calculating a middle point in the vehicle width direction of the measured left and right tire attaching positions as a second reference position; and
adjusting the suspension assembly or the vehicle body frame member such that the first reference position and the second reference position are coincident with each other.

2. The method according to claim 1, wherein the method is carried out at a plurality of stations of a transfer line for transferring the vehicle body frame member, and
the step of measuring the left and right damper attaching positions is carried out at a former station, and the step of measuring the left and right tire attaching positions is carried out at a later station.

3. The method according to claim 1, further comprising:
scanning three or more portions of a periphery of each of the damper attaching positions by a distance sensor of a noncontact type, in the step of measuring the left and right damper attaching positions.

* * * * *